Jan. 16, 1962

W. S. THOMPSON 3,017,026

WEIGHT CHECKING APPARATUS

Filed June 17, 1957

INVENTOR
WENDELL S. THOMPSON

BY Hans G. Hoffmeister

ATTORNEY

Jan. 16, 1962     W. S. THOMPSON     3,017,026
WEIGHT CHECKING APPARATUS Filed June 17, 1957     4 Sheets-Sheet 2

FIG_3

FIG_4

INVENTOR
WENDELL S. THOMPSON
BY Hans G. Hoffmeister
ATTORNEY

United States Patent Office 3,017,026
Patented Jan. 16, 1962

3,017,026
WEIGHT CHECKING APPARATUS
Wendell S. Thompson, Los Gatos, Calif., assignor to FMC Corporation, a corporation of Delaware
Filed June 17, 1957, Ser. No. 665,893
12 Claims. (Cl. 209—121)

The present invention appertains to weight checking apparatus.

An object of the present invention is to provide an improved high speed weight checking apparatus.

Another object is to provide an apparatus that detects and rejects a package that differs in weight from a predetermined weight requirement.

Another object of the present invention is to provide an apparatus for weighing and segregating a continuously advancing succession of articles, which apparatus is sensitive to relatively small differences of weight from a predetermined weight requirement.

Another object is to provide a weight checking apparatus having a scale that is preloaded so as to be sensitive only to packages meeting a minimum weight requirement.

Other objects and advantages of the present invention will become apparent from the following description and the drawings, in which.

The high speed weight checking apparatus 10 (FIGS. 1 and 2) comprises a suitable support structure 11 having a top plate 12 supported by front and rear members 13 and 14, which in turn are secured to a base plate 15. Suitable struts 16 are provided to further brace the support structure 10. Vertical side members 20 and 21 are supported by and project upward from the plate 12 and are secured thereto by pairs of angle brackets 22 and 23.

A feed conveyor 25, supported by a suitable support structure 26, advances filled packages to the weight checking apparatus 10 by means of an endless belt 27, which is continuously driven by suitable means, not shown. Positioned above the conveyor 25 is a star wheel 28 supported by a frame 29, which wheel operates in timed relation with the belt 27 to space the filled packages a predetermined distance apart along the conveyor 25.

The conveyor 25 feeds the spaced packages to a second conveyor 30 having an endless belt 31 which passes over a weighing platform 32 (FIGS. 1, 3, 4 and 5) so that the weight of each package advanced by the belt 31 will be imposed upon the platform 32. Since the conveyors 25 and 30 are continuously driven, the platform 32 is constructed of sufficient length so that each package is supported individually thereon for a period of time enabling the platform 32 and the scale 33 to react to the weight of any package meeting minimum weight requirements.

Figure 1:
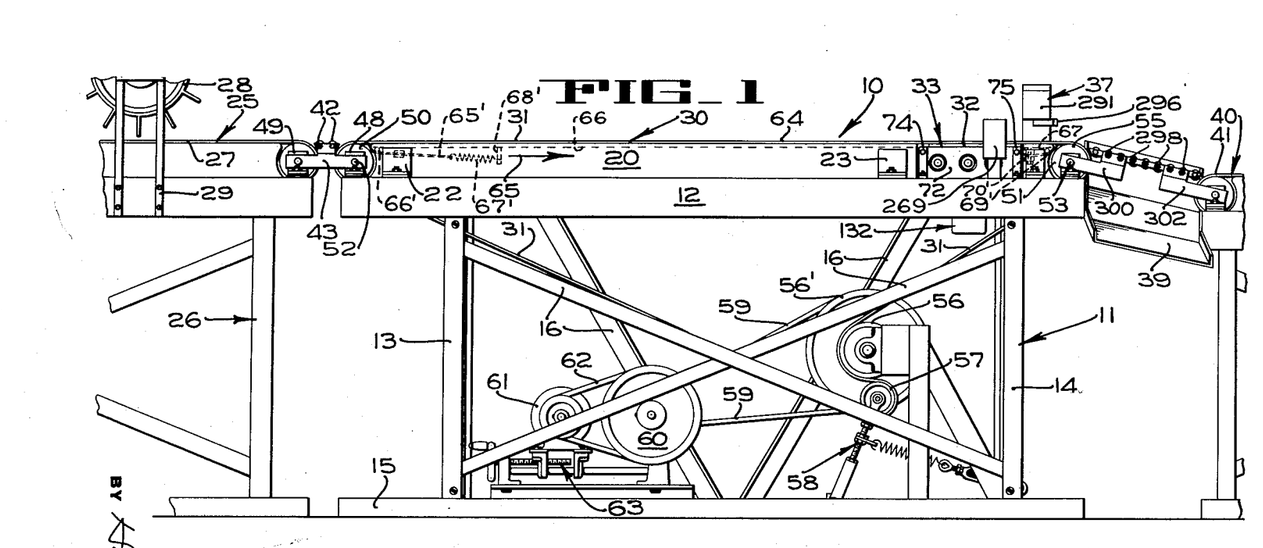
FIG. 1 is a side elevation of the article weighing and segregating apparatus of the present invention.
Figure 2:
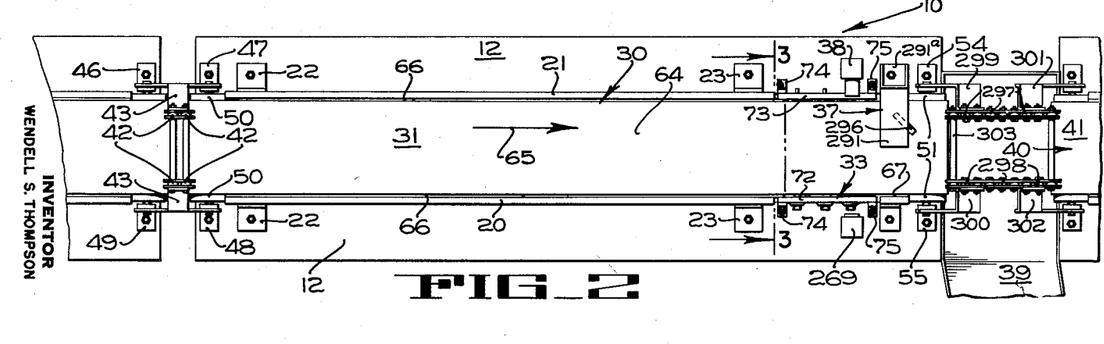
FIG. 2 is a plan of the apparatus shown in FIG. 1.
Figure 3:
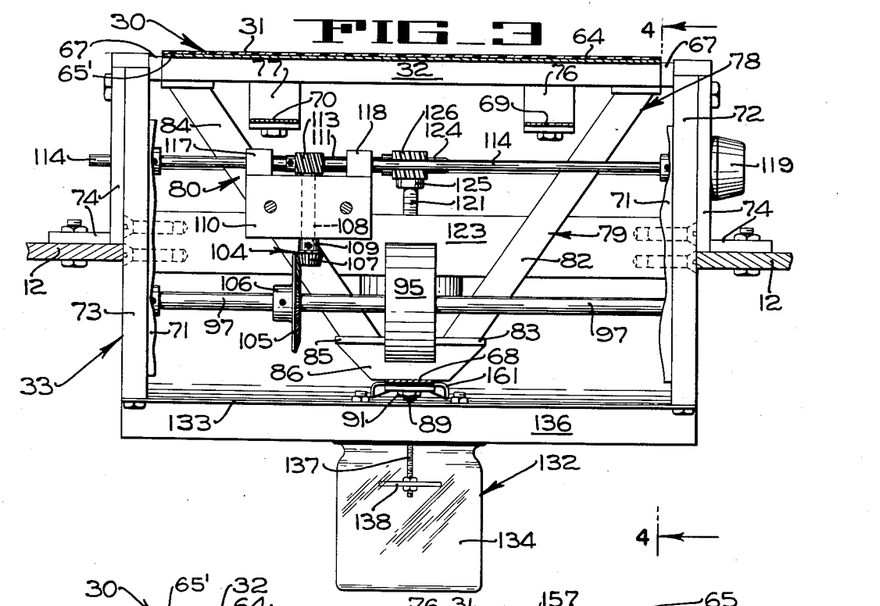
FIG. 3 is an enlarged section taken along line 3—3 of FIG. 2 to illustrate the weighing scale of the apparatus.
Figure 4:
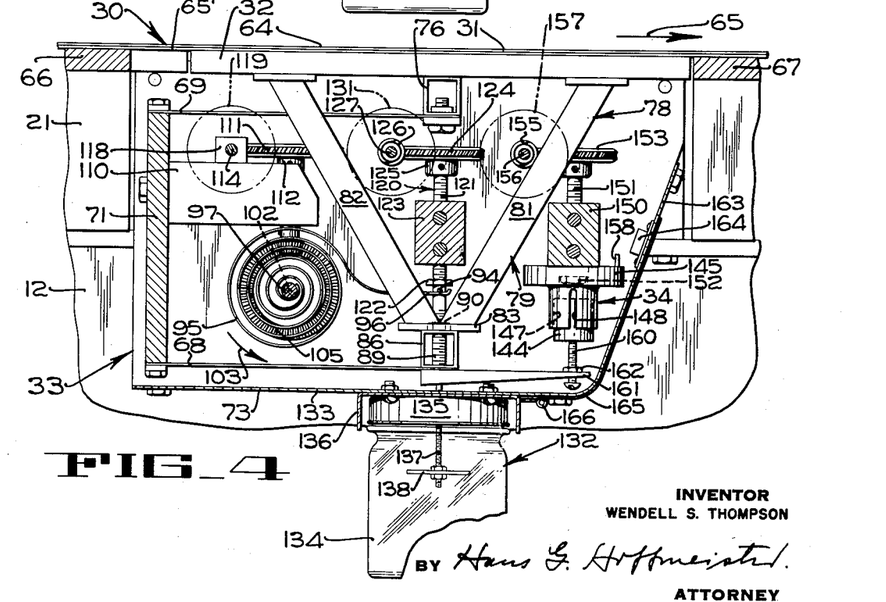
FIG. 4 is a section along line 4—4 of FIG. 3.
Figure 5:
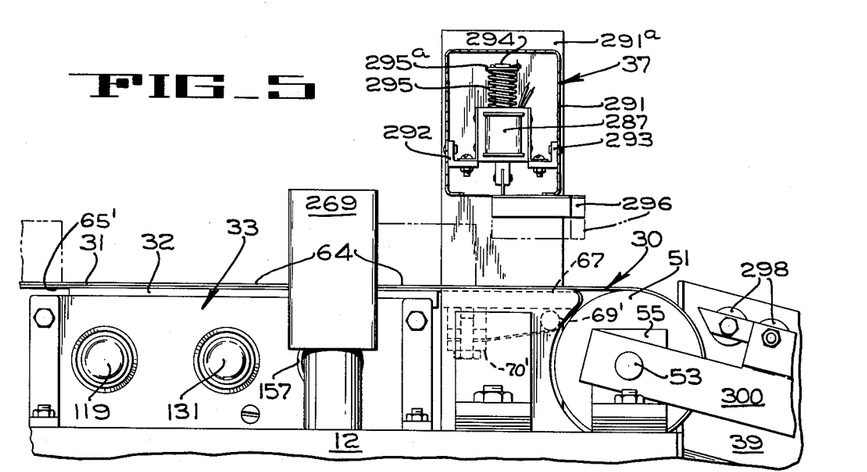
FIG. 5 is an enlarged fragmentary side elevation of the apparatus shown in FIG. 1 illustrating the rejecting mechanism of the apparatus.
Figure 6:
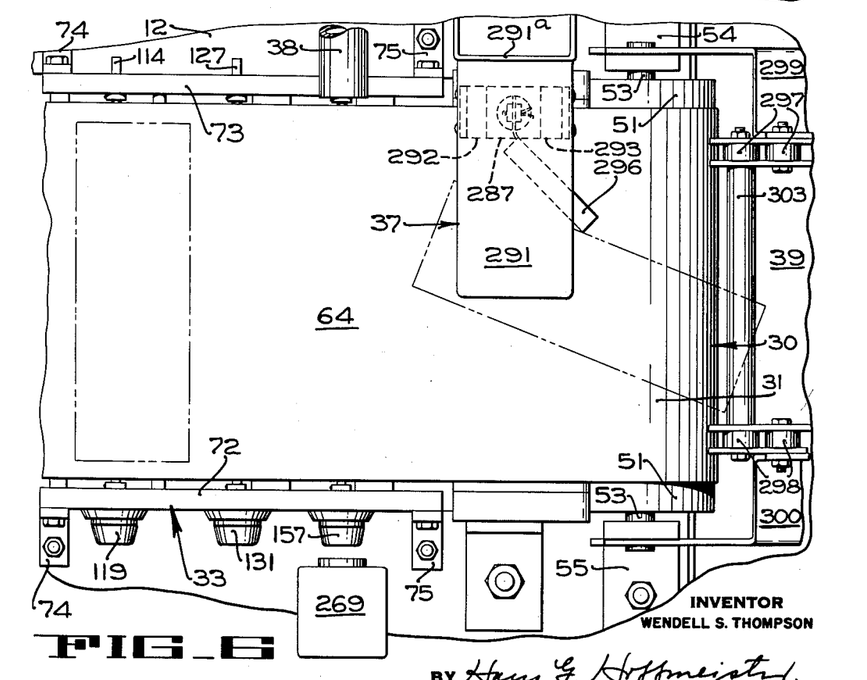
FIG. 6 is an enlarged fragmentary plan of the apparatus shown in FIG. 2 further illustrating the rejecting mechanism.

The scale 33 has associated therewith an electromechanical transducer 34 (FIGS. 4 and 7) which in response to the depression of the platform 32 produces a voltage signal. This voltage signal is detected and rectified by a detector circuit 35 (FIG. 7) and is transmitted to a control circuit 36 (FIG. 7) which controls the operation of a solenoid-operated rejecting mechanism 37 (FIGS. 1, 5 and 6). Adjacent the scale 33 is positioned a photoelectric tube 38 (FIGS. 2 and 7) which is responsive to the presence of a package on the platform 32 to condition the control circuit 36 for operation. The control circuit 36 energizes the solenoid of the rejecting mechanism 37 when a package weighing less than the minimum requirement advances over the scale 33. The rejecting mechanism 37, when operated, pivots the underweight package to realign the underweight package for discharge into a reject chute 39 (FIGS. 1 and 2). Packages of proper weight continue in their movement uninterrupted by the rejecting mechanism 37. From the weight checking apparatus 10, the filled packages of proper weight are advanced to a suitable loading platform by a discharge conveyor 40 having an endless belt 41, which is continuously driven by suitable drive means, not shown.

The platform 32 is spring-supported, and the scale 33 is preloaded so that a package whose weight is equal to or in excess of the minimum weight requirement of the packages to be inspected causes a sufficient deflection in the platform 32 to prevent actuation of the rejecting mechanism 37.

Disposed between the feed conveyor 25 and the weight checking apparatus 10 are a plurality of spaced parallel rollers 42 (FIGS. 1 and 2) that are supported by plates 43. The plates 43 are secured to the feed conveyor 25 and the weight checking apparatus 10 by angle brackets 46, 47, 48 and 49. The space between the feed conveyor 25 and the weight checking apparatus 10 is relatively narrow with respect to the width of the packages advanced thereon so as not to alter the spacing of the filled packages advanced by the conveyor 25.

Spaced packages are advanced by the conveyor 25 onto the rollers 42 and are subsequently received by the conveyor 30 of the weight checking apparatus 10. The belt 31 of the conveyor 30 is made of suitable thin, flexible material such as vinyl coated nylon fabric, and consequently is highly flexible. For continuously operating the endless belt 31, two freely rotatable pulleys 50 and 51 are provided, which are disposed at opposite ends of the top plate 12. The pulley 50 is mounted for rotation about a shaft 52, which is received by the angle brackets 47 and 48. Similarly, the pulley 51 is mounted for rotation about a shaft 53, which is received by angle brackets 54 and 55 carried by the top plate 12. The belt 31 is also trained around a drive pulley 56 (FIG. 1) and an idler pulley 57 of a belt tensioning device 58. A pulley 56' is mounted on a common shaft with the pulley 56 and is driven by a V-belt 59, which is trained around a pulley, not shown. The last mentioned pulley is mounted on a common shaft with a sheave 60, which is driven by an electric motor 61 through a V-belt 62. To tension the drive belt 62, the motor 61 is carried by an adjustable motor mount 63.

*Preloaded weighing device*

The conveyor belt 31 between the pulleys 50 and 51 provides a horizontal run 64 upon which spaced filled packages are continuously advanced in the direction shown by arrow 65 for individual weighing by the preloaded scale 33. The scale 33 (FIGS. 3 and 4) comprises the horizontal article receiving platform 32, which is disposed below and contiguous to the run 64 of the belt 31 between the side members 20 and 21 of the support structure 11. Fixed horizontal platforms 66 and 67 (FIG. 2) of the support structure 11 are disposed below the run 64 and in juxtaposition with the platform 32 to assist in supporting the packages approaching and leaving the scale 33.

Below the horizontal run 64 and extending over the platforms 66, 67 and 32 is a thin, flexible stationary strip 65' (FIG. 1), which may be of thin flexible sheet metal. One end of the strip 65' is flexed below the platform 66 over a roller 66' and is secured to an extension spring 67' that is anchored to the platform 66 by a post 68'. The other end of the strip 65' is flexed below the platform 67 over a roller 69' and is anchored to the platform 67 by a clamp 70'. The strip 65' is effective in reducing friction between the belt 31 and the platform 66, 67, 32 without materially interfering with the sensitivity of the scale 33 and also is effective in functioning as a shield to reduce the effect of static electricity.

For supporting the article receiving platform 32 by a parallelogram type mounting, flexible flat leaf springs 68, 69 and 70 (FIGS. 3 and 4) are provided, which are horizontally disposed and extend longitudinally in the general direction of travel of the packages received by the platform 32. The flat leaf springs 68, 69 and 70 are anchored at one end thereof to a fixed support end plate 71, which is disposed transversely to the platform 32. The end plate 71 is rigid with side plates 72 and 73, which are fixedly secured to the top plate 12 of the support structure 11 by means of angle brackets 74 and 75. Secured to the free ends of springs 69 and 70 are hollow posts 76 and 77, respectively, which are rigid with the underside of the platform 32. The leaf springs 69 and 70 are arranged parallel to one another and spaced apart in a horizontal plane, while the leaf spring 68 is disposed intermediate thereof and in a horizontal plane spaced below the horizontal plane passing through the leaf springs 69 and 70. Thus, the platform 32 can move in a vertical direction only, since all horizontal forces are resisted by the leaf springs 68, 69 and 70. Accordingly, the horizontal force of a moving package does not influence depression of the platform 32 and the depression thereof is not a function of the position of the package on the platform 32.

Disposed between the free end of the flat leaf spring 68 and the platform 32 is a support structure 78 comprising two V-shaped frames 79 and 80, which slope inwardly and downwardly so as to be centrally disposed below the platform 32. The frame 79 includes hollow struts 81 and 82 secured to the underside of platform 32, which struts converge and terminate on a horizontal plate 83. Similarly, frame 80 comprises two hollow struts (only strut 84 being shown), secured to the underside of platform 32, which struts converge and terminate on a horizontal plate 85. The plates 83 and 85, which are secured to a hollow cross beam 86, are parallel and spaced from one another in a horizontal plane. On the underside of the cross beam 86 is secured the free end of spring 68. Accordingly, the platform 32 is supported by the flat leaf springs 68, 69 and 70 for movement in a vertical direction, and the support structure 78 and the cross beam 86 move in unison with the platform 32.

The scale 33 is preloaded so that the platform 32 descends sufficiently to prevent operation of the rejecting mechanism 37 only when the weight of a package thereon is equal to or in excess of the minimum weight requirement. For this purpose, a vertically disposed bolt 89 (FIG. 4) is fixedly secured to the cross beam 86 by nuts 90 and 91. Projecting from the bolt 89 is a pin 94 that is constantly urged upward by a laterally extending free end 96 of a spiral preloading spring 95. Thus, the spiral spring 95 continuously urges the platform 32 upwardly by transmitting force through the support structure 78 and the cross beam 86 to preload the scale 33.

The preload spring 95 is carried by a horizontal shaft 97 that is journalled in the side plates 72 and 73 of the scale 33 for rotation. For adjusting the preload tension of the spiral spring 95, the shaft 97 has secured thereto a radially projecting pin 102, which is received by a suitable hole in the innermost turn of the coil spring 95 encircling the shaft 97. Accordingly, rotation of the shaft 97 in the direction shown by the arrow 103 increases the upward force exerted by the spiral spring 95 against the pin 94.

To accurately adjust the preloading of the scale 33, bevel gears 104 are provided which comprise a driven gear 105 secured to the shaft 97 by its hub 106 and a drive gear 107 meshing therewith. The gear 107 is carried by one end of a vertical shaft 108 and is secured thereto by its hub 109. At the other end thereof, shaft 108 is carried by a worm wheel 111, which is secured thereto by its hub 112. The worm wheel 111 meshes with a worm 113 secured to a horizontal shaft 114, which is mounted for rotation within the side plates 72 and 73. The shaft 114 is also journalled within ears 117 and 118 of a support plate 110, which is fixed to the end support plate 71 and includes a bore for receiving the shaft 108 for rotation therewithin. A knob 119 is secured to the shaft 114 for imparting rotative movement thereto to set the desired preloading tension of the spiral spring 95 by transmitting rotational force to the shaft 97 through the bevel gears 104, shaft 108 and gears 111, 113.

In order to maintain the platform 32 at even height with the fixed platforms 66 and 67, and also to maintain the flat leaf springs 68, 69 and 70 at zero slope when the scale 33 is not depressed by a package, an adjustable stop 120 is provided. The adjustable stop 120 comprises a vertical adjusting screw 121 having the lowermost extremity thereof engaging the head 122 of the bolt 89. The screw 121 is received by a threaded bore within a support member 123, which is fixed to the side plates 72 and 73. A worm wheel 124 is secured to the uppermost portion of the adjusting screw 121 by its hub 125, which worm wheel meshes with a worm 126 carried by a horizontal shaft 127. The shaft 127 is journalled in the side plates 72 and 73. A knob 131 (FIGS. 5 and 6) is secured to the shaft 127 to impart rotary movement thereto for adjusting the height of the screw 121, and thus to determine the uppermost position to which the scale platform 32 can be raised by the action of the spiral spring 95. The vertical movement of the adjustment screw 121 is relatively small so that movement thereof never interferes with proper meshing between the worm wheel 124 and the worm 126.

To dampen any oscillation or vibration of the scale 33, a damping device 132 (FIGS. 3 and 4) is secured to a base plate 133 of the scale 33, which base plate is rigid with the side plates 72, 73 and the end plate 71. The damping device 132 comprises a vessel 134 containing a suitable fluid. A cap 135 is secured by threaded engagement to the vessel 134. A support plate 136 is secured to the cap 135 by suitable means such as nuts and bolts, which support plate is similarly secured to the base plate 133. The support plate 136 and cap 135 have centrally disposed apertures through which a threaded rod 137 is freely movable. The lower end of the rod 137 has secured thereto a paddle 138, while the upper end of the rod 137 is secured to the lower end of the bolt 89 which is drilled and tapped for that purpose. Thus, the rod 137 moves in a vertical direction with the movement of the support structure 78 and the platform 32. Since the movement of the paddle 138 is resisted by the fluid within the vessel 134, any tendency of the scale 33 to vibrate is effectively minimized by the damping device 132.

As previously described, the platform 32 descends far enough to prevent operation of the rejecting mechanism 37 only when the weight of a package thereon is equal to or greater than the minimum weight requirement of the packages being checked. When the weight of a package is equal to the minimum weight requirement, the resultant depression of the platform 32, though slight, is sufficient to prevent the operation of the rejecting mechanism 37. Packages having a weight in excess of the minimum weight requirement depress the platform 32 a distance proportional to the amount of excess.

In order to detect any depression of the platform 32, the electromechanical transducer 34 (FIGS. 4 and 7) in the form of a detector transformer and a suitable source of excitation voltage therefor (FIG. 7) are provided. The detector transformer comprises a primary winding 140, and two secondary windings 141 and 142, respectively, all of which are mounted in fixed relative positions within a suitable cylindrical housing 144. The detector transformer likewise includes a core 143 which is mounted (by means presently to be described), adjacent and for movement relative to the windings.

The transformer housing 144 is rigidly secured to a carrier 145 by being seated within a tightly fitting socket 147 integral with and projecting downward from the carrier 145. One or more longitudinal slots 148 are provided in the wall of the socket 147 to facilitate insertion of the transformer housing 144 into the socket 147. An adjustment screw 151 in threaded engagement with and extending vertically through a support beam 150 has its lower end rigidly secured to the transformer carrier 145 by being threaded through the latter into the bore of the socket 147. A nut 152 threaded onto the lower end of the screw 151 locks the screw 151 to the carrier 145.

In order to turn the adjusting screw 151 and thereby effect raising or lowering of the transformer housing 144, a worm wheel 153 is secured to the upper end of the screw 151. The worm wheel 153 is operably engaged with a worm 155 carried by a shaft 156 journalled in the side plates 72 and 73 and extending through the former to receive a knob 157 (FIGS. 5 and 6). Accordingly, an operator can, by manually turning the knob 157, attain adjustment of the transformer housing 144 to the precise height desired.

A stop pin 158 rigid with the carrier 145 is adapted to engage the support beam 150 and thus limit rotation of the screw 151 and carrier 145 to approximately one third of a turn, which has been found to be ample to attain the extent of vertical adjustment of the transformer windings that is necessary to meet operating requirements. Such limited movement of the parts prevents interference with proper meshing of the worm 155 and worm wheel 153, and likewise prevents damage to the conductors (not shown) leading to the transformer windings.

The movable core 143 of the detector transformer 34 is connected to one end of a rigid support arm 161 (FIG. 4) by an adjusting screw 160 which is threaded through the arm 161 and is secured thereto in selected position of adjustment by a nut 162. At the other end of the support arm 161 is an aperture to receive the bolt 89, which bolt is secured to the support arm by the same nut 91 that secures the cross beam 86 to the bolt 89.

Accordingly, when the platform 32 is depressed by a package having the desired weight, the movement of the platform 32 causes the support structure 78 and the cross beam 86 to lower. The lowering of the cross beam 86 depresses the support arm 161 and thereby displaces the core 143 relatively to the windings of the detector transformer 34.

The base plate 133 of the scale 33 has an upwardly directed end portion 163 which serves to shield the detector transformer 34 against stray magnetic fields. Secured to the end portion 163 is a receptacle 164 for making connection with the electrical conductors (not shown) that are connected to the transformer windings 140, 141 and 142. A hinged door 165 is mounted on the end portion 163 by a spring hinge 166 to permit access to the bolt 160 for adjusting the position of the core 143. A portion of the base plate 133 adjacent the bolt 160 is removed so as not to interfere with the downward displacement of the core 143.

*Detector and control circuits*

As hereinbefore indicated, the detector transformer 34 with its source of excitation voltage is an electromechanical transducer that translates the linear deflection of the platform 32 into electrical voltage signals. For this purpose, the primary winding 140 of the detector transformer 34 is energized by a suitable oscillator 167 (FIG. 7), which is the source of excitation voltage. When the primary winding 140 is energized by the oscillator 167, voltages are induced in the secondary windings 141 and 142, respectively. The secondary windings 141 and 142 are connected in series opposition. Consequently, the two voltages induced in the secondary windings 141 and 142 are opposite in phase and the net voltage across the output of the secondary windings 141 and 142 is the difference of the two voltages. For the electrical central position of the core 143, the net output voltage is zero. This is called the balance point or null position. As the core 143 is displaced from the null position, the voltage induced in the secondary winding toward which the core 143 is moved increases, while the voltage induced in the other secondary winding decreases. This produces a differential voltage across the output of secondary windings 141 and 142, which varies linearly with the change in core position. Movement of the core 143 in an opposite direction beyond the null position produces a similar linear voltage characteristic, but with the phase of the output voltage shifted 180°.

When the scale platform is in its uppermost position, which is the no load position, the core 143 of the detector transformer 34 is disposed relatively to the windings 140, 141 and 142 so that a desired output voltage is produced across the secondary windings 141 and 142. This is accomplished by adjusting the bolt 160 (FIG. 4) for coarse adjustment and adjusting the knob 157 for fine adjustment.

When the platform 32 receives a package having a weight less than the desired value, the resultant movement of the platform 32, if any, is insufficient to displace the core 143 in a manner to alter materially the output voltage of the detector transformer 34. However, the platform 32, when receiving thereon a package having a weight equal to or in excess of the minimum weight requirement, moves the core 143 sufficiently to effect a material voltage change in the output of transformer 34. It is to be observed, however, that the detector transformer 34 is capable of detecting the magnitude of linear descent of the platform 32 and of producing a signal indicative of such magnitude. This, of course, is a function of the amount by which the weight of the article on the platform exceeds the minimum weight requirement.

The signals produced by the secondary windings 141 and 142 of the transducer 34 are transmitted to a suitable alternating current amplifying stage 183 (FIG. 7) and the output signals of the amplifying stage 183 are fed to a suitable phase discriminator or detector stage 204 that converts the amplified signals into direct current signals representative of the magnitude of depression of the platform 32. A reference voltage signal is fed to the detector stage 204 from the oscillator 167. The detected signal output is transmitted to a suitable direct current amplifying stage 221 that has output conductors 244, 246 and 248 connected thereto. The specific structure of the detector circuit 35, which includes the alternating current amplifying stage 183, the detector stage 204 and the direct current amplifying stage 221, does not constitute any part of the invention and various well-known and conventional circuits may be used to produce the desired effect. For example, the Sanborn Strain Gage Amplifier Model No. 140 may be employed to provide the entire detector circuit 35 as well as the oscillator that is used for exciting the detector transformer 34. When a package received by the platform 32 has a weight equal to or in excess of the minimum weight requirement, the potential on conductor 246 with respect to the potential on conductor 248 is negative. When a package received by the platform 32 has a weight less than the minimum weight requirement, the potential on conductor 246 with respect to the potential on conductor 248 is positive. The direct current output voltages from the detector circuit 35 are transmitted over conductors 246 and 248 to the control circuit 36, which controls the operation of the rejecting mechanism 37, whereby a package having a weight less than the desired weight is deflected into the reject chute 39 and a package having a desired weight is carried by the discharge conveyor 40 to a suitable loading platform, not shown.

The control circuit 36 (FIG. 7) includes a suitable power supply 249, which operates in a conventional manner and comprises a suitable on-off switch 250 and a power transformer 251. The primary winding 252 of the transformer 251 is connected through the switch 250 to a suitable source of alternating current across supply conductors 253 and 254.

A pair of thyratron tubes 255 and 256 are included in the control circuit 36 and are connected in series so that the conduction of either one is dependent upon the firing of the other. In other words, tubes 255 and 256 will fire only when both tubes are maintained conductive and neither tube will fire when the other tube is not rendered conductive. The thyratron tube 255 has its screen grid 255a connected to its cathode 258 through a resistor 257. A control grid 260 of tube 255 is maintained negative with respect to the cathode 258 to bias the tube to cut-off, whereby the thyratron tube 255 is normally prevented from firing. This is accomplished by connecting the plate 261 of a photoelectric tube 38 to the grid 260 of thyratron tube 255 through resistor 263 and by connecting the emitter 264 of photoelectric tube 38 to the negative side of the power supply 249 through resistor 265. The anode voltage of photoelectric tube 38 is controlled by resistor 266 and variable resistor 268 that are connected to the positive side of the power supply 249.

The photoelectric tube 38 (FIGS. 2, 6 and 7) is positioned at one side of the conveyor belt run 64 toward the rearward portion of the platform 32 adjacent the rejecting mechanism 37. At the other side of the conveyor belt run 64 opposite the photoelectric tube 38 is a suitable lamp 269, which is energized by a transformer 270 connected across the supply conductors 253 and 254 through the main control switch 250. The photoelectric tube 38 and the lamp 269 are so disposed (FIGS. 2 and 6) that the lamp 269 continuously projects a beam of light toward the photoelectric tube 38. When a package is advanced over the rearward portion of the platform 32, the beam of light is temporarily interrupted by the oncoming package to block out the light emitted to the photoelectric tube 38. Accordingly, the photoelectric tube 38 conducts continuously, excepting when an advancing package interrupts the projecting light beam.

Thus it may be seen that while the photoelectric tube 38 conducts, the grid 260 of the thyratron tube 255 is negative with respect to the cathode 258 to bias the thyratron tube 255 to cut-off, since the potential is applied to the grid 260 through the photoelectric tube 38. When the photoelectric tube 38 is non-conductive, the grid 260 becomes positive with respect to the cathode 258, since a positive potential is applied to the grid 260 through the resistors 266 and 268. By applying a positive potential to the grid 260, the thyratron tube 255 is made capable of conducting. Theerfore, the thyratron tube 255 is biased to prevent firing, excepting when an advancing package interrupts the beam of light projected onto the photoelectric tube 38.

The thyratron tube 255 does not fire, however, until the thyratron tube 256 is rendered conductive, since the plate 271 of the thyratron tube 255 is connected in series with the cathode 272 of the thyratron tube 256.

The cathode 272 of the thyratron tube 256 is connected to the conductor 248 of the detector circuit 35 and a grid 276 of thyratron tube 256 is connected through a resistor 277 to the conductor 246. As previously explained, with the scale platform 32 in its no load position, the potential on grid 276 is positive with respect to the potential on cathode 272. Therefore, thyratron tube 256 is normally biased for conducting. Accordingly, when the platform 32 receives a package having a weight less than the minimum requirement, the potential on conductor 246 with respect to the potential on conductor 248 is positive, thereby enabling the thyratron tube 256 to conduct. However, when the platform 32 reacts to a package of desired weight, the potential on conductor 246 with respect to the potential on conductor 248 is negative, thereby preventing the thyratron tube 256 from firing.

In view of the foregoing, thyratron tubes 255 and 256 can conduct simultaneously only. This occurs when an advancing package interrupting the beam of light projected onto the photoelectric tube 38 has a weight less than the minimum requirement.

The thyratron tube 256 has a screen grid 278 thereof connected to the cathode 272 through a resistor 279. A capacitor 280 is connected between the grid 276 and cathode 272 thereof to stabilize the circuit. The plate 281 of thyratron tube 256 and plate 271 of thyratron tube 255 are connected to relatively high resistors 282 and 273 to maintain circuit stability. Plate 281 receives its plate potential from the power supply 249 through contacts 283 of thermal time delay relay 284. When the switch 250 is closed, relay 284 is energized and closes contacts 283 after a sufficient time delay to enable the filaments of thyratron tubes 255 and 256 to be heated. Upon closing contacts 283, a plate potential is applied to the plate 281 of thyratron tube 256 from its power supply 249 over the following path: contacts 304, relay coil 247, and contacts 283.

When thyratron tube 256 conducts, the operating coil 247 of relay 285 is energized over the just mentioned path to cause contacts 286 to close, thereby completing an operating circuit for a rejecting solenoid 287 over the following path: conductor 254, switch 250, solenoid 287, contacts 286 and conductor 253. Energization of the operating coil 247 of the relay 285 likewise opens the contacts 304 to open the plate circuit of thyratron tube 256, thereby resetting the thyratron tubes 255 and 256 for the succeeding operation. A resistance-capacitance time delay circuit 288 is connected in parallel with the operating coil 247 of the relay 285 to delay the deenergization thereof, thereby maintaining the contacts 286 closed for a sufficient length of time to enable the solenoid 287 to operate. Resistance-capacitance networks 289 and 290, connected in parallel with the contacts 286 and 304, respectively, reduce arcing across their associated contacts. Thus, the solenoid 287 operates when a package having a weight less than the minimum requirement has advanced over the rearward portion of the platform 32.

*Segregating device*

The rejecting mechanism 37 (FIGS. 5 and 6) which includes the solenoid 287, comprises a housing 291 mounted between the scale 33 and the reject chute 39 by a bracket 291a secured to the top plate 12. The housing 291 is suitably spaced above the conveyor belt 31 so as not to interfere with the movement of the packages advanced by the conveyor belt 31 and rigidly supports a pair of horizontally spaced support brackets 292 and 293 (FIG. 5) extending transversely of the run 64. The solenoid 287, which is vertically disposed, is supported by the brackets 292 and 293 for transverse adjustment relative to the conveyor run 64. A vertical solenoid core 294 is normally retained in an elevated position by a coil spring 295 that is under compression between a suitable abutment 295a secured to the upper portion of the core 294 and the upper surface of the solenoid 287. The lower portion of the core 284 carries an angularly projecting orienting arm 296 covered with suitable resilient material such as sponge rubber. Accordingly, energization of the solenoid 287 lowers the core 294 against the action of spring 295 to project the orienting arm 296 into the path of advancing packages and deenergization of the solenoid 287 enables the spring 295 to raise the core 294 and thereby lift the orienting arm 296 out of the path of oncoming packages.

Packages are initially positioned on the conveyor belt 31 with their longitudinal axis transverse to the conveyor run 64. When the orienting arm 296 is lowered into the path of an oncoming package (FIG. 6) having a weight less than the minimum weight requirement, the leading surface of the lightweight package engages the angularly disposed arm 296 causing the advancing package to pivot substantially 90 degrees under the continuous movement of the lightweight package and thereby assume a position wherein the longitudinal axis of the lightweight package extends generally in the direction of movement of the conveyor run 64. A package having the desired weight does not engage the orienting arm 296, since the solenoid 287 is not energized by the control circuit 36 when such a package advances over the platform 32.

Disposed between the conveyor 30 and the discharge conveyor 40 and positioned above the discharge chute 39 are transversely spaced longitudinally extending discharge conveyors in the form of series 297 and 298 of rollers (FIGS. 1, 2, 5 and 6) that slope downwardly in the direction of movement of the packages. The rollers of the set 297 and 298, respectively, are supported by brackets 299 and 300, secured to the top plate 12 and brackets 301 and 302 secured to the support structure of the discharge conveyor 40. The series of rollers 297 and 298 are spaced apart a distance less than the length of the packages, so that the packages having their longitudinal axes directed transversely of their direction of movement are advanced on the rollers of both sets 297 and 298 to the discharge conveyor 40, and then advanced by the discharge conveyor 40 to a suitable loading platform, not shown. The packages oriented by the arm 296, so that their longitudinal axes extend in the general direction of travel, drop into the reject chute 39 between the spaced series of rollers 297 and 298. A transverse roller 303 is provided to assist in the movement of packages from the conveyor 30 to the reject chute 39.

A suitable registering device, such as a conventional recorder 304 (FIG. 7) having a stylus and chart (not shown), is connected to the conductors 246 and 248. The recorder is responsive to the output signal of the direct current amplifier stage 221 for registering the magnitude of the difference in the weight of a package from the minimum weight requirement. Additionally, a voltmeter 305 (FIG. 7) is connected to the conductors 246 and 248 in parallel with the recorder 304 through a switch 306 and a resistor 307. The voltmeter 305, when the switch 306 is closed, is actuated to indicate a reading representing the magnitude of depression of the platform 32. Therefore, the reading of the voltmeter 305 represents the amount by which the weight of a package differs from the minimum weight requirement.

*Operation*

In the operation of the weight checking apparatus 10 of the present invention, packages are placed upon the feed conveyor 25 with the longitudinal axes of the packages disposed transversely to the conveyor belt 27. The star wheel 28 associated with the feed conveyor 25 arranges the packages advanced thereon into a predetermined spaced relationship so that only one package at a time is supported by the platform 32 and that the time interval between packages is adequate to permit the scale 33 to return to its undepressed position.

Figure 7:
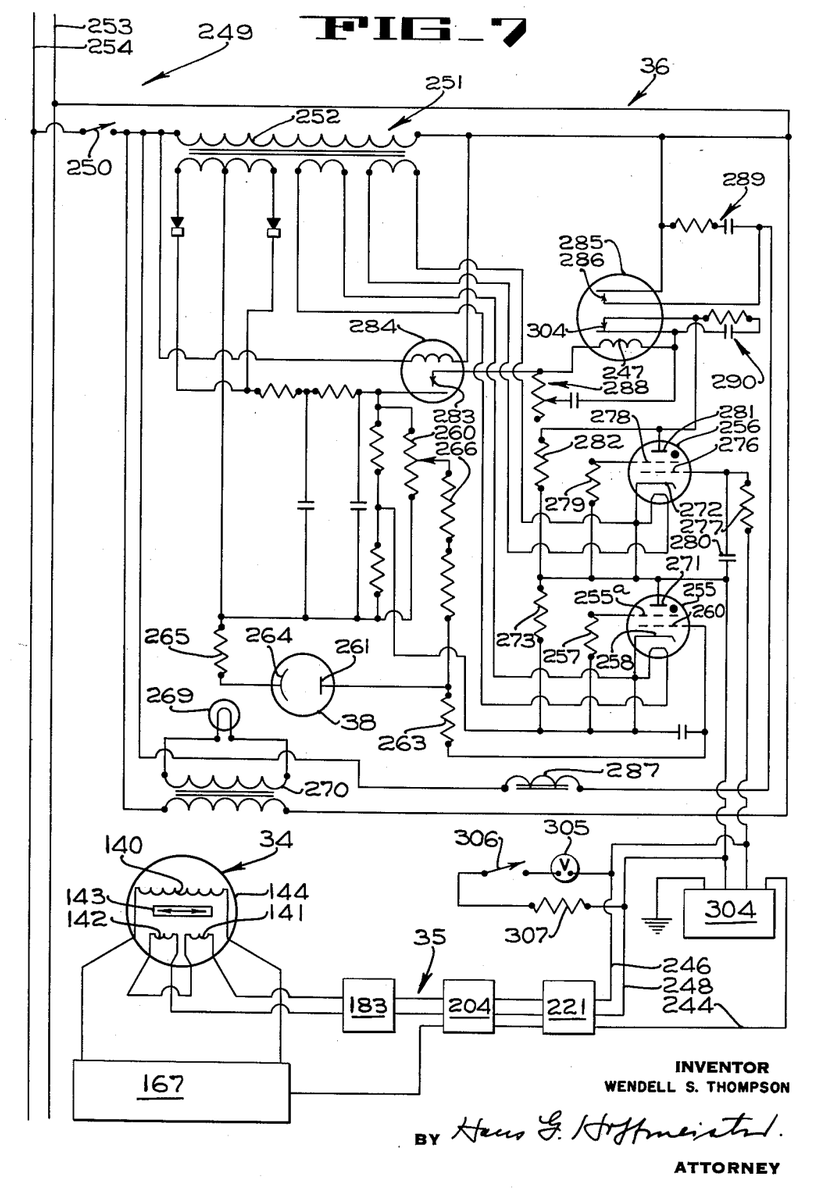
FIG. 7 is a schematic diagram of a detector and control circuit for the weighing and segregating apparatus of the invention.

The feed conveyor 25 advances the spaced packages in a continuous procession over the platform 32 of the scale 33, which descends when the weight of a package thereon is equal to or exceeds minimum weight requirement. This movement of the scale platform causes displacement of the core 143 relative to the windings 140, 141 and 142 to effect the production of a net voltage across the secondary windings 141 and 142 that is representative of the magnitude of depression of the platform 32. The output of the secondary windings 141 and 142 is transmitted to the detector circuit 35 (FIG. 7).

Connected to the detector circuit 35 is the control circuit 36, which includes thyratron tubes 255 and 256 connected in series, whereby both tubes must conduct simultaneously in order for either tube to fire. The thyratron tube 255 is biased to cut-off through the photoelectric tube 38 which is positioned adjacent the scale 33 toward the rearward portion of the platform 32. The photoelectric tube 38 normally conducts to prevent the thyratron tube 255 from firing. When the rearward portion of the platform 32 has a package thereon, photoelectric tube 38 is rendered non-conductive and the thyratron tube 255 is conditioned for firing. The thyratron tube 256 is biased by the detector circuit 35 for conducting. However, when a package having a weight equal to the minimum weight requirement causes the platform 32 to descend, the detector circuit 35 prevents the thyratron tube 256 from firing. Therefore, the thyratron tubes 255 and 256 fire simultaneouslyl when a package having a weight less than the desired weight is advanced across the platform 32. The solenoid 287 of the rejecting mechanism 37 is energized when the thyratron tubes 255 and 256 conduct.

From the platform 32, the packages are advanced toward the rejecting mechanism 37, which is operated by the solenoid 287. When a package having a weight less than the desired weight interrupts the light beam projected from the lamp 269 toward the photoelectric cell 38, the solenoid 287 is energized to lower the orienting arm 296 into the path of the oncoming underweight package. The underweight package is turned by the lowered orienting arm so that the longitudinal axis of the underweight package is shifted from a position transverse to the belt 31 to a position extending in the general direction of travel of the belt 31. The package so shifted is advanced to drop between the series of rollers 297 and 298 into the reject chute 39. When a package having the desired weight interrupts the light beam, the solenoid 287 is not energized and the arm 296 remains in the raised position out of the path of the oncoming package of desired weight. The package of proper weight is then advanced by the rollers 297 and 298 to the discharge conveyor 40 that carries the package of proper weight to a suitable loading platform, not shown.

Although the weight checking apparatus has been described as being adapted to weigh packages, it is to be understood that it can be employed to weigh articles, containers, or other items adaptable for weighing processes.

It will be understood that modifications and variations of the embodiment of the invention disclosed herein may be resorted to without departing from the spirit of the invention and the scope of the appended claims.

Having thus described my invention, what I claim as new and desire to protect by Letters Patent is:

1. In a weight testing apparatus, means for continuously advancing articles along a predetermined path, a weighing device having a platform below and adjacent said path, means for preloading said weighing device to a predetermined value, said platform being depressible by an article passing thereacross having a weight in excess of the predetermined preload value, means responsive to movement of said platform for producing an electrical signal representative of the height of said platform, a rejecting mechanism mounted adjacent said path for deflecting articles individually while the articles are being advanced along said path, a control circuit including serially connected electron tubes for controlling the operation of said rejecting mechanism, light responsive means connected to one of said tubes for controlling the conductivity thereof in response to the presence of an article on said platform, and a detector circuit responsive to the electrical signal transmitted by said platform movement responsive means for rendering another of said tubes conductive when the article received by said platform has a weight less than the predetermined value, said control circuit being arranged to operate said rejecting mechanism upon simultaneous conduction of said tubes when the article advancing across said platform has a weight less than the predetermined value.

2. In a weight-checking and segregating apparatus, means for continuously advancing oblong articles along a predetermined path, a weighing device disposed at a fixed point along said path and activated by an article advancing thereacross having a weight different from a predetermined value, a solenoid mounted adjacent said path and spaced from said weighing device in the direction of travel of the articles, an article-orienting arm controlled by said solenoid for movement from a position out of the path of advancing articles to a position in the path of advancing articles, means responsive to the activation of said weighing device for operating said solenoid to position said arm into the path of a weighed article having a weight different from a predetermined value so that engagement of said arm by the advancing weighed article turns the article to dispose its longitudinal axis into a position generally parallel with the direction of travel, and article discharging means mounted in position to receive articles from said advancing means and extending in the direction of travel of the weighed articles, said discharging means being spaced apart a distance less than the length of a weighed article and greater than the width of the weighed article, whereby a weighed article having the longitudinal axis thereof oriented generally transversely to said path advances over said discharging means and a weighed article having the longitudinal axis thereof aligned with said path drops between said discharging means.

3. In a testing and segregating apparatus, means for continuously advancing oblong articles along a predetermined path with their longitudinal axes generally transverse to said path, a weighing device at a fixed point along said path in position to be depressed by an article engaged by said advancing means having a weight in excess of a predetermined value, a solenoid mounted adjacent said path and spaced from said weighing device in the direction of travel of the articles, a plunger arm controlled by said solenoid for movement from a position out of the path of advancing articles to a position in the path of advancing articles, means responsive to the weight of said weighing device for operating said solenoid to position said arm into the path of a weighed article having a weight less than the predetermined value so that engagement of said arm by the advancing lightweight article shifts the longitudinal axis thereof into a position generally parallel with the direction of travel, and article discharging means mounted adjacent the discharge end of said path and extending in the direction of travel of the weighed articles, said discharging means being spaced apart a distance less than the length of a weighed article and greater than the width of the weighed article, whereby a weighed article having the longitudinal axis thereof oriented generally transversely to said path advances over said discharging means and a weighed article having a weight less than the predetermined value drops between said discharging means.

4. In a weighing apparatus, means for continuously advancing articles along a predetermined path, a scale having a platform adjacent said path movable by the weight of an article being advanced by the advancing means, means responsive to movement of said platform for transmitting electrical signals, a rejecting mechanism mounted adjacent said path and spaced from said weighing device in the direction of movement of the articles, means for operating said rejecting mechanism to turn articles while being advanced by said advancing means, a control circuit including serially connected electron tubes for controlling the operation of said rejecting mechanism, light responsive means connected to one of said tubes for controlling the conductivity thereof in response to the passage of an article across said platform, and a detector circuit connected to another of said tubes for controlling the conductivity thereof in response to said electrical signals, said control circuit being arranged to operate said rejecting mechanism when said tubes become conductive.

5. In a segregating apparatus, a conveyor for advancing oblong articles along a predetermined path, article orienting means mounted adjacent said path, means for selectively operating said article orienting means for shifting relative to said path the longitudinal axes of selected ones of said advancing articles, and a pair of article discharging means mounted in position to receive articles from said conveyor and extending in the general direction of travel of an article, said discharging means being spaced apart a distance less than the length of an article and greater than the width of an article, whereby an article having the longitudinal axis thereof oriented generally transversely to said path passes over said discharging means and an article having the longitudinal axis thereof generally parallel to said path drops between said discharging means.

6. In a weighing apparatus, a flexible belt having a run for advancing articles along a predetermined path, a scale having a depressible platform disposed adjacent said path in position to support articles advanced by said belt, support platforms disposed adjacent said path in juxtaposition with said scale platform to assist in supporting articles approaching and leaving said scale platform, and a flexible strip disposed below said run and extending over said scale and support platforms for reducing friction between said belt and said platforms.

7. In a weighing apparatus, a conveyor belt for advancing articles to be weighed, and a scale disposed adjacent said conveyor belt, said scale comprising a scale platform, means yieldably supporting said platform in a predetermined position for receiving articles advanced by said belt, means yieldably urging said platform upwardly past said position to preload said platform to a predetermined value, said platform being downwardly movable by an article weighing more than the predetermined value, and stop means operatively associated with said scale platform for arresting upward movement of said platform at said position.

8. Apparatus for automatically segregating articles by weight with the articles being of substantially uniform length and uniform width, with their length exceeding their width, and with the articles all being fed to the apparatus with the same initial relative orientation; said apparatus comprising a flexible conveyor having a horizontal reach for moving the articles in a predetermined path, means for continuously driving said conveyor, an article weighing scale disposed beneath and against said horizontal conveyor reach, article orienting means movably mounted above said article path and between said weighing scale and the discharge end of the conveyor, means for moving said article orienting means into and out of said path for turning articles on said moving conveyor reach by a predetermined angle, means responsive to the action of said article weighing scale for controlling said article orienting moving means to move the latter into the path of those articles failing to meet a predetermined standard of weight, and article segregating means disposed at the discharge end of said conveyor and extending from said end generally in the direction of travel of said conveyor reach, said segregating means having spaced article support means, the spacing of said article support means being greater than the width of a weighed article and less than the length of a weighed article for supporting weighed articles disposed along said segregating means when the longitudinal axes of the articles extend across said article support means, while simultaneously accommodating passage of weighed articles between said article support means when the longitudinal axes of the articles are generally parallel to said article support means.

9. Apparatus for linearly transporting and automatically segregating articles by weight with the articles being of substantially uniform length and uniform width, with their length exceeding their width, and with the articles all being fed to the apparatus with their longitudinal axes transverse to their direction of feed; said apparatus comprising a flexible conveyor having a horizontal reach for moving the articles in a predetermined path, means for continuously driving said conveyor, an article weighing scale disposed beneath and against said horizontal conveyor reach, article orienting means movably mounted above said article path and between said weighing scale and the discharge end of the conveyor, means for moving said article orienting means into and out of said path for turning articles on said moving conveyor reach so that their longitudinal axes are generally parallel to said path, means responsive to the action of said article weighing scale for controlling said article orienting means to move the latter into the path of those articles failing to meet a predetermined standard of weight, and article segregating means disposed at the discharge end of said conveyor and extending from said end generally in the direction of travel of said conveyor reach, said segregating means having laterally spaced article support means, the lateral spacing of said article support means being greater than the width of a weighed article and less than the length of a weighed article for supporting weighed articles disposed along said segregating means when the longitudinal axes of the articles are undisturbed and so extend across said article support means, while simultaneously accommodating passage of weighed articles between said article support means when the articles have been turned by said article orienting means to place their longitudinal axes generally parallel to said support means.

10. Apparatus for automatically segregating articles by weight with the articles being of substantially uniform length and uniform width, with their length exceeding their width, and with the articles all being fed to the apparatus with the same initial relative orientation; said apparatus comprising a flexible conveyor having a horizontal reach for moving the articles in a predetermined path, means for continuously driving said conveyor, means for weighing articles moving along said horizontal conveyor reach, article orienting means disposed between said weighing scale and the discharge end of the conveyor for turning articles on said moving conveyor reach by a predetermined angle, means responsive to the action of said article weighing scale for controlling said article orienting means to cause said orienting means to turn those articles failing to meet a predetermined standard of weight, and article segregating means disposed at the discharge end of said conveyor and extending from said end generally in the direction of travel of said conveyor reach, said segregating means having spaced article support means, the spacing of said article support means being greater than the width of a weighed article and less than the length of a weighed article for supporting weighed articles disposed along said segregating means when the longitudinal axes of the articles extend across said article support means, while simultaneously accommodating passage of weighed articles between said article support means when the longitudinal axes of the articles is generally parallel to said article support means.

11. Apparatus for automatically segregating articles by weight with the articles being of substantially uniform length and uniform width, with their length exceeding their width, and with the articles all being fed to the apparatus with the same initial relative orientation; said apparatus comprising an article conveyor having a horizontal reach for moving the articles in a predetermined path, means for continuously driving said conveyor, means for weighing articles on said conveyor, article orienting means movably mounted above said article path and between said weighing means and the discharge end of the conveyor, means for moving said article orienting means into and out of said path for turning articles on said moving conveyor reach by a predetermined angle, means responsive to the action of said article weighing means for controlling said article orienting means to move the latter into the path of those articles failing to meet a predetermined standard of weight, and article segregating means disposed at the discharge end of said conveyor and extending from said end generally in the direction of travel of said conveyor reach, said segregating means having spaced article support means, the spacing of said article support means being greater than the width of a weighed article and less than the length of a weighed article for supporting weighed articles disposed along said segregating means when the longitudinal axes of the articles extend across said article support means, while simultaneously accommodating passage of weighed articles between said article support means when the longitudinal axes of the articles are generally parallel to said article support means.

12. Apparatus for checking the weight of articles comprising means for advancing articles along a predetermined path, and a scale disposed along said path; said scale comprising a support, a platform for supporting articles advanced by said article advancing means, spring means interconnecting said platform and said support for yieldably supporting said platform, and stop means between said support and said platform for arresting upward movement of said platform by said spring means when said platform reaches a predetermined position; said spring means including an adjustable pre-loaded spring mounted between said support and said platform for urging said platform upwardly against said stop means, said spring means preloading said platform with a predetermined force when the latter is against said stop means, said predetermined force equalling the sum of the tare weight of the platform and a predetermined weight that equals a substantial portion of the weight of a standard weight article; an article having a weight in excess of said predetermined weight causing said platform to move downwardly from said stop means a certain distance, said distance being substantially less than the distance represented by the product of the effective unit deflection rate of said spring means and the weight of the article being weighed.

References Cited in the file of this patent
UNITED STATES PATENTS
964,670    Moncreife  ------------- July 19, 1910
(Other references on following page)

UNITED STATES PATENTS

| | | |
|---|---|---|
| 1,385,218 | McIntyre | July 19, 1921 |
| 1,806,879 | Lindgren | May 26, 1931 |
| 1,990,105 | Taylor | Feb. 5, 1935 |
| 2,059,038 | Sala | Oct. 27, 1936 |
| 2,066,869 | Wild | Jan. 5, 1937 |
| 2,251,596 | O'Malley | Aug. 5, 1941 |
| 2,415,177 | Hurley | Feb. 4, 1947 |
| 2,417,642 | Gilchrist | Mar. 18, 1947 |
| 2,560,446 | Jagen | July 10, 1951 |
| 2,568,255 | Schieser et al. | Sept. 18, 1951 |
| 2,610,052 | MacGeorge | Sept. 9, 1952 |
| 2,623,741 | Broekhoysen | Dec. 30, 1952 |
| 2,699,932 | Knobel | Jan. 18, 1955 |
| 2,732,067 | Cunningham | Jan. 24, 1956 |
| 2,759,603 | Bradley | Aug. 21, 1956 |
| 2,793,026 | Giardino et al. | May 21, 1957 |
| 2,849,116 | Fried | Aug. 26, 1958 |
| 2,954,969 | McCullough | Oct. 4, 1960 |